United States Patent Office 3,235,533
Patented Feb. 15, 1966

3,235,533
SYNTHETIC LINEAR POLYCARBONAMIDES CONTAINING SULFONIC ACIDS AND HAVING AN IMPROVED RECEPTIVITY FOR ACID DYES
George H. Brinkman, Jr., Gulf Breeze, Santa Rosa, Fla., assignor, by mesne assignments, to Monsanto Company, a corporation of Delaware
No Drawing. Filed July 15, 1960, Ser. No. 42,962
15 Claims. (Cl. 260—78)

This invention relates to modified synthetic linear polycarbonamides having an improved receptivity for acid dyes and to a process for producing the same.

The polymeric substances with which this invention is concerned are synthetic, high molecular weight, fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity, and insolubility in most solvents except mineral acids, formic acid, and the phenols. Upon hydrolysis with strong mineral acids, the polymers revert to the reactants from which they were formed.

The simple polyamides of this type are usually made by heating substantially equimolecular proportions of a diamine with a dicarboxylic acid until the product has polymerized to the fiber-forming stage, which stage is not generally reached until the polyamide has an intrinsic viscosity of at least 0.4, the intrinsic viscosity being defined as $$\frac{Log_e N_r}{C}$$

in which $N_r$ is the relative viscosity of a dilute solution of the polymer in m-cresol in the same units and at the same temperature, and C is the concentration in grams of polymer per 100 cc. of solution. The polymers thus obtained have high melting points and can be cold drawn to form strong, highly oriented fibers.

The diamines and dicarboxylic acids or amide-forming derivatives thereof which can be used as reactants to yield the simple fiber-forming polyamides are well known to the art. Suitable diamines may be represented by the general formula $NH_2[CH_2]_nNH_2$ in which $n$ is an integer of 2 or greater and preferably from 2 to 10. Representative examples are ethylenediamine, propylenediamine, tetramethylenediamine, pentamethylenediamine, hexamethylenediamine, octamethylenediamine and decamethylenediamine. Suitable dicarboxylic acid reactants are represented by the general formula HOOCRCOOH in which R is a divalent hydrocarbon radical having a chain length of at least two carbon atoms. These dicarboxylic acids are illustrated by sebacic acid, octadecanedioic acid, adipic acid, suberic acid, azelaic acid, undecanedoic acid, glutaric acid, pimelic acid, brassylic acid and tetradecanedioic acid. The amide-forming derivatives of diamines which can be employed include the carbamate and N-formyl derivative. Suitable amide-forming derivatives of the dibasic carboxylic acids comprise the mono- and di-ester, the anhydride, the mono- and di-amide and the acid halide.

While it is known that textiles produced from the aforenoted polyamides have some affinity for acid dystuffs, it is not enough to permit deep shade dyeing. Furthermore, the dye take-up rate is relatively slow and plates limits on attainable productivity in the manufacture of dyed fabrics and other dyed articles.

Attempts have been made in the past to improve the dyeing characteristics of polyamide fibers and fabrics by treating the same with various chemical agents. However, the chemical treatment of an already formed polymer product merely facilitates dye absorption but does not increase the inherent capacity of the polymer for taking up more dye. Moreover, large quantities of treating agents are generally required, i.e., often as high as 10 percent. Consequently, better methods for enhancing the dyeing characteristics of polyamide fibers and fabrics, particularly with respect to a capability for increasing the capacity of these polymers to absorb greater amounts of acid dyestuffs have been sought for a long time.

Accordingly, it is a principal object of the present invention to prepare synthetic linear polyamides which will dye to deep shades when dyed with acid type dyestuffs.

Another object is to prepare synthetic linear polyamides which will absorb acid dyes at an increased rate.

These and other objects will become apparent in the course of the following specification and claims.

In accordance with the present invention a fiber-forming synthetic linear polycarbonamide is prepared by reacting a polyamide-forming composition consisting of substantially equimolecular proportions of a dicarboxylic acid and a diamine in the presence of from about 0.35 to 14.0 mol percent based on said polyamide-forming composition of a sulfonic acid compound having the general formula:

wherein R is an alkyl, monoaryl or alkyl substituted monoaryl radical having from 1–26 carbon atoms. In addition, the diamine salts of these sulfonic acids are applicable for the purpose of this invention.

Examples of sulfonic acids included within the scope of the aforenoted general formula and which are suitable for the purposes of the present invention are phenyl sulfonic acid, p-toluene sulfonic acid, o-toluene sulfonic acid, n-propyl phenylsulfonic acid, p-isopropyl phenylsulfonic acid, 1,3,5-trimethyl phenylsulfonic acid, 1,2,3,4-tetramethyl phenylsulfonic acid, 1-methyl-4-isopropyl phenylsulfonic acid, o-xylene sulfonic acid, methane sulfonic acid, ethane sulfonic acid, heptane sulfonic acid, 3-methylbutane-1 sulfonic acid, propane-1-sulfonic acid, n-octadecyl sulfonic acid, n-decyl sulfonic acid, etc.

As has been indicated, the diamine salts of the aforenoted sulfonic acids are also applicable. These salts may be obtained in the usual manner by reacting equivalent weights of the sulfonic acid of choice with an appropriate diamine. The diamines that may be employed in forming the afore-noted salts are any of those which have been noted as applicable in producing the fiber-forming polyamides. That is, those diamines which may be represented by the general formula $NH_2[CH_2]_nNH_2$ in which $n$ is an integer of 2 or greater and preferably from 2 to 10. Among specific examples which may be mentioned are pentamethylenediamine, hexamethylenediamine, octamethylenediamine and decamethylenediamine. The diamine used to form the sulfonic acid salt may be the same as or different from that employed in forming the polyamide salt. That is, the same or different diamines may be present in forming the polymers of this invention.

The modified synthetic linear polyamides as described herein are prepared by procedures well-known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties. This condition is reached when the polyamide has an intrinsic viscosity of at least 0.4 in accordance with the definition of intrinsic viscosity as given hereinabove. The reaction can be conducted at super-atmospheric, atmospheric, or sub-atmospheric pressure. Often it is desirable, especially in the last stage of the reaction, to employ conditions, e.g., reduced pressure, which will aid in the removal of the reaction by-products. The aforedescribed sulfonic acid compounds or their amine salts may be added to the polymerization autoclave with the polyamide-forming reactants or separately either before or after the polymerization reaction has begun. The conventional polyamide-forming reactants are normally introduced as a pre-formed salt but may be in the form of uncombined diamine and dicarboxylic acid when added to the autoclave.

In order to illustrate the invention and the advantages thereof with greater particularity, the following specific examples are given, it should be understood that they are intended to be only illustrative and not limitative. Parts are given by weight unless otherwise indicated.

*Example I*

This example illustrates the preparation of a conventional fiber-forming polyamide and is to be used as a standard of comparison with the modified polyamides of the present invention.

A mixture of 406 lbs. of a 50 percent aqueous solution of hexamethylene diammonium adipate and 300 grams of an aqueous solution containing 25 percent acetic acid, as a viscosity stabilizer was charged to a stainless steel autoclave. The autoclave had been previously purged of air by the use of steam. The pressure and temperature were slowly raised until values of 250 p.s.i.g. and 220° C. respectively were reached. Sufficient titanium dioxide in aqueous slurry to produce a semi-delustered yarn (0.3 percent titanium dioxide on the weight of the yarn ultimately produced) was added prior to this point when the temperature reached 210° C. Water was then removed as condensate. The pressure was held constant until a temperature of 243° C. was obtained. At this point the pressure reduction cycle began. The pressure decreased to atmospheric during a 90 minute period. Following a 30 minute holding cycle, the finished polymer was cast as a continuous ribbon, cooled and then cut into coarse flake-like particles. The polymer flake obtained was then spun into yarn on conventional melt spinning equipment and the yarn was stretched on a drawtwister. Final denier of the 13 filament yarn was 40. Elongation at break was 27 percent.

*Example II*

A mixture of 406 lbs. of a 50 percent aqueous solution of hexamethylene diammonium adipate and 400 grams of an aqueous solution containing 25 percent acetic acid, as a viscosity stabilizer was charged to a stainless steel autoclave. The autoclave had been previously purged of air by the use of steam. The pressure and temperature were slowly raised; and when the temperature reached 170° C. there was added 266 grams of p-toluene sulfonic acid. When the temperature reached 210° C. sufficient titanium dioxide in aqueous slurry to produce a semi-delustered yarn (0.3 percent titanium dioxide on the weight of the yarn) was added. Water was then removed as condensate. The pressure was held constant at a level of 250 p.s.i.g. until a temperature of 243° C. was obtained. At this point the pressure reduction cycle began. The pressure was decreased to atmospheric during a 90 minute period. Following a 30 minute holding cycle, the finished polymer was cast as a continuous ribbon, and cut into coarse flake-like particles. The resulting polymer chips were spun into yarn as before and the yarn was drawn to a 27 percent elongation. The final denier of the 13 filament yarn was 40.

*Example III*

A mixture of 406 lbs. of a 50 percent aqueous solution of hexamethylene diammonium adipate and 400 grams of an aqueous solution containing 25 percent acetic acid, as a viscosity stabilizer was charged to a stainless steel autoclave which had been purged of air by the use of steam. The pressure and temperature were slowly raised, and when the temperature reached 170° C. there was added 530 grams of p-toluene sulfonic acid. When the temperature reached 210° C. sufficient titanium dioxide in aqueous slurry to produce a semi-delustered yarn (0.3 percent titanium dioxide on the weight of the yarn ultimately obtained) was added. Water was then removed as condensate. The pressure was held constant at a level of 250 p.s.i.g. until a temperature of 243° C. was obtained. At this point the pressure reduction cycle began. The pressure was decreased to atmospheric during a 90 minute period. Following a 30 minute holding cycle, the finished polymer was cast as a continuous ribbon, and cut into coarse flake-like particles. The polymer chips were spun and drawn to a 27 percent elongation. The final denier of the 13 filament yarn was 40.

*Example IV*

A mixture of 406 lbs. of a 50 percent aqueous solution of hexamethylene diammonium adipate and 300 grams of an aqueous solution containing 25 percent acetic acid, as a viscosity stabilizer was charged to a stainless steel autoclave. The autoclave had been previously purged of air by the use of steam. The pressure and temperature were slowly raised, and when the temperature reached 170° C., there was added 1.05 mol percent of ethane sulfonic acid based on the hexamethylene diammonium adipate. When the temperatuer reached 210° C. sufficient titanium dioxide in aqueous slurry was added to produce a semi-delustered yarn (0.3 percent titanium dioxide on the weight of the yarn ultimately produced). Water was then removed as condensate. The pressure was held constant at a level of 250 p.s.i.g. unfil a temperature of 243° C. was obtained. At this point, the pressure reduction cycle began. The pressure was decreased to atmospheric over a 90 minute period. Following a 30 minute holding cycle, the finished polymer was cast as a continuous ribbon, which was subsequently cut into coarse flake-like particles. These polymer particles were spun yarn on standard melt spinning equipment and the yarn was drawn to a 27 percent elongation. The final denier of the 13 filament yarns was 40.

In order to demonstrate the practical usefulness of the modified polyamides of the present invention, comparative tests on the above examples were conducted to determine relative receptivity for acid dyestuffs. Swatches of fabric obtained from the yarn of each of the above examples were dyed with comparable concentrations of the commercial dyestuff Scarlet 4RA (C.I. Acid Red 18). The dyeing was conducted in a bath having a liquor to fiber ratio of 40:1. The bath temperature was maintained at 212° F., and the dyeing period was two hours in length. The dye absorption values were determined by measuring spectrophotometrically the changes in dye bath concentration, i.e., the difference between the original dye concentration and the dye concentration after equilibrium conditions had been reached. The following results were obtained.

| Example | Initial Acid Dye Conc., Percent on Weight of Fabric | Percent Acid Dye Absorbed on Weight of Fabric |
|---|---|---|
| I (Control) | 3.0 | 1.37 |
| II | 3.0 | 1.60 |
| III | 3.0 | 2.63 |
| IV | 3.0 | 2.63 |

From the above table, it is readily apparent that fabrics prepared from polymers obtained in accordance with this invention are capable of absorbing substantially more acid dye than fabrics prepared form conventional polyamides.

Dyeing results similar to those shown in the table above are obtained when for the sulfonic acid reactant in each of the above described examples, there is substituted an equivalent molar quantity of the corresponding diamine salts. Thus, for example, the hexamethylenediamine salt of p-toluene sulfonic acid may be substituted for the p-toluene sulfonic acid in the above described Example II with equally good dye absorption results.

In order to further illustrate the principles and practice of the present invention, comparative dyeing rate measurements were made on Example I (Control) and Example III. The dye used was Scarlet 4RA (C.I. Acid Red 18) which was employed in a concentration of 4.0 percent on the weight of the fabric in a dye bath having a liquor to fiber ratio of 65:1. The dye bath was maintained at a temperature of 60° C. The dyeing was carried out until the half-dyeing time was reached, i.e., the time required for the fiber to absorb one-half of it capacity. Specific deying rate constants were then determined in accordance with the following expression:

$$K_1 = 0.5 \ C\infty\sqrt{d/t_{1/2}}$$

where $K_1$=specific dyeing rate constant
$C\infty$=equilibrium dye absorption
$t_{1/2}$=time of half-dyeing, i.e., time in min. for the fiber to absorb one-half of its capacity of dye
$d$=filament denier The following results were obtained in making the afore-described determinations:

| Example | $t_{1/2}$ (min.) | C | (d) filament denier | $K_1$ |
|---|---|---|---|---|
| I (Control) | 21 | 1.33 | 3.08 | 0.25 |
| III | 20 | 2.63 | 3.08 | 0.51 |

In comparing the specific dye rate constants ($K_1$) in the above table, is noted that the increase in rate of the modified polyamide (Example III) is better than twice that of the control (Example I).

It is apparent from the foregoing examples and the test data given in connection therewith that the modified polyamides of this invention are markedly improved over unmodified polyamides in their receptivity for acid dyestuffs. While applicant does not wish to be bound by any theory of operation, it is postulated that the polyamide modification in accordance with the present invention involves reaction between the modifying agent and the diamine used in forming the polyamide, thus preventing loss of diamine from the polyamide-forming reaction zone. Because the diamines employed in forming synthetic linear polyamides are relatively voltatile, losses are normally experienced during the polyamide-forming reaction. Consequently, the resulting polymer has a lesser number of amine end groups than might otherwise be available for providing dye sites for acid dyes. This loss of diamine is prevented by tying it up with the modifying agent with which it reacts.

Although a particular acid dye was employed in the examples used to illustrate this invention, it is understood, of course, that the advantages of the invention are realized with all acid dyestuffs which are capable of dyeing polyamide articles. Benefits are also realized with other classes of dyes, such as neutral metal complex dyes, reactive dyes, premetallized dyes and others.

The modified polyamides of this invention are of primary interest for use in the manufacture of yarns and fabrics. They are, however, equally useful in other end products where an enhanced receptivity for dyes may be desired, e.g., bristles, films and the like.

In the preparation of the polyamides of this invention other modifying agents may be added, for example, delusterants, anti-oxidants, plasticizers, etc.

As many widely different embodiments of this invention may be made without departing from the spirit and scope thereof, it is to be understood that the invention is not to be limited by the specific embodiments set forth herein but only by the claims which follow.

I claim:
1. A fiber-forming synthetic linear polycarbonamide having an improved dye receptivity and of the type having recurring amide groups as an integral part of the main polymer chain, and wherein said groups are separated by at least 2 carbon atoms, which comprises the product obtained from reactants comprising (A) a polyamide-forming composition consisting of substantially equimolecular proportions of a dicarboxylic acid of the formula HOOCRCOOH wherein R is a divalent hydrocarbon radical having a chain length of at least 2 carbon atoms and a diamine of the formula $NH_2[CH_2]_nNH_2$ wherein $n$ is an integer of at least 2, and (B) from about 0.35 to 14.0 mol percent based on said polyamide-forming composition of a compound selected from the group consisting of sulfonic acids of the formula:

$$R-SO_3H$$

wherein R is a hydrocarbon radical having from 1–26 carbon atoms selected from the group consisting of alkyl, monoaryl and alkyl substituted monoaryls, and diamine salts of said sulfonic acids.

2. The fiber-forming synthetic linear polycarbonamide as set forth in claim 1, wherein said polyamide-forming composition consists of substantially equimolecular proportions of adipic acid and hexamethylenediamine.

3. The fiber-forming synthetic linear polycarbonamide as set forth in claim 1, wherein said sulfonic acid is p-toluene sulfonic acid.

4. The fiber-forming synthetic linear polycarbonamide as set forth in claim 1, wherein said sulfonic acid is phenyl sulfonic acid.

5. The fiber-forming synthetic linear polycarbonamide as set forth in claim 1, wherein said sulfonic acid is ethane sulfonic acid.

6. The fiber-forming synthetic linear polycarbonamide as set forth in claim 1, wherein said diamine salt of said sulfonic acid is the hexamethylene-diamine salt of p-toluene sulfonic acid.

7. The fiber-forming synthetic linear polycarbonamide as set forth in claim 1, wherein said diamine salt of said sulfonic acid is the hexamethylenediamine salt of ethane sulfonic acid.

8. A textile fiber comprising the polycarbonamide as defined in claim 1.

9. A process for making fiber-forming synthetic linear polycarbonamides with improved receptivity for acid dyestuffs which comprises polymerizing a polyamide-forming composition consisting of substantially equimolecular proportions of a dicarboxylic acid of the formula HOOCRCOOH wherein R is a divalent hydrocarbon radical having a chain length of at least 2 carbon atoms and a diamine of the formula $NH_2[CH_2]_nNH_2$ wherein $n$ is an integer of at least 2 in the presence of from about 0.35 to 14.0 mol percent based on said polyamide-forming composition of a compound selected from the group consisting of sulfonic acids of the formula:

$$R-SO_3H$$

wherein R is a hydrocarbon radical having from 1–26 carbon atoms selected from the group consisting of alkyls, monoaryl and alkyl substituted monoaryls, and the diamine salts of said sulfonic acids.

10. The process set forth in claim 9 wherein said polyamide-forming composition consists of substantially equimolecular proportions of adipic acid and hexamethylenediamine.

11. The process set forth in claim 9 wherein said sulfonic acid is p-toluene sulfonic acid.

12. The process set forth in claim 9 wherein said diamine salt of said sulfonic acid is the hexamethylenediamine salt of p-toluene sulfonic acid.

13. The process set forth in claim 9 wherein said sulfonic acid is phenyl sulfonic acid.

14. The process set forth in claim 9 wherein said sulfonic acid is ethane sulfonic acid.

15. The process set forth in claim 9 wherein said diamine salt of said sulfonic acid is the hexamethylenediamine salt of ethane sulfonic acid.

References Cited by the Examiner

UNITED STATES PATENTS 2,317,751  4/1943  Frolich _____ 260—78

FOREIGN PATENTS 543,843  3/1942  Great Britain.

WILLIAM H. SHORT, *Primary Examiner.*

B. MANGAN, LOUISE P. QUAST, *Examiners.*